//  United States  [11] 3,893,752
Tojyo  [45] July 8, 1975

[54] MICROSCOPE OBJECTIVE
[75] Inventor: Tsutomu Tojyo, Tokyo, Japan
[73] Assignee: Olympus Optical Co., Ltd., Tokyo, Japan
[22] Filed: May 17, 1974
[21] Appl. No.: 471,060

[30] Foreign Application Priority Data
May 18, 1973 Japan................. 48-56034

[52] U.S. Cl. ............... 350/229; 350/176; 350/177
[51] Int. Cl. .......................... G02b 9/12; G02b 1/00
[58] Field of Search..................... 350/229, 177, 176

[56] References Cited
UNITED STATES PATENTS
3,552,831  1/1971  Shoemaker........................ 350/176

*Primary Examiner*—Paul A. Sacher
*Attorney, Agent, or Firm*—Cushman, Darby & Cushman

[57] ABSTRACT

A microscope objective comprising a small number of lenses by arranging a single lens made of glass of high refractive index and low dispersion as the first lens component, aberrations of said microscope objective being corrected quite favourably.

1 Claim, 5 Drawing Figures

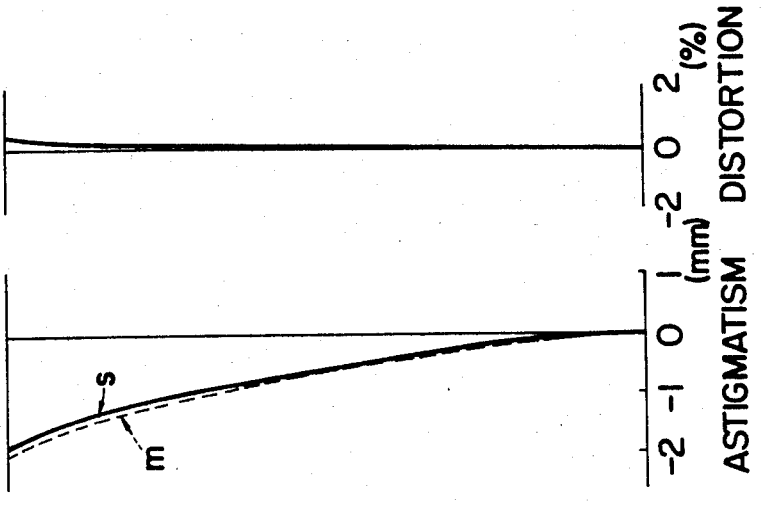

MICROSCOPE OBJECTIVE

BACKGROUND OF THE INVENTION

1. Field of the invention

The present invention relates to a microscope objective of the achromat class with the magnification about 40x.

2. Description of the prior art

Various microscope objectives of the achromat class with magnifications about 40x for which aberrations are favourably corrected exist already. However, most of those conventional microscope objectives comprise for example four lens components of six lenses and, as the number of lenses is large, it was very difficult to reduce the cost of lens systems.

SUMMARY OF THE INVENTION

It is, therefore, the primary object of the present invention to provide a microscope objective of the achromat class with the magnification about 40x comprising a small number of lenses, i.e., three lens components of five lenses for which aberrations are corrected quite favourably.

BRIEF DESCRIPTION OF THE DRAWINGS

FIGS. 2A, 2B, 2C and 2D show graphs of aberration curves of the preferred embodiment of the microscope objective according to the present invention.

DETAILED DESCRIPTION OF THE PREFERRED EMBODIMENT

Figure 1:
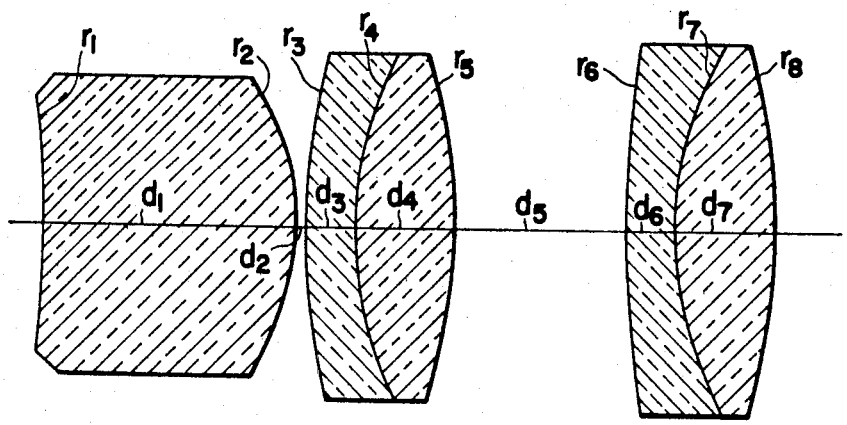
FIG. 1 shows a sectional view illustrating the lens arrangement of the microscope objective according to the present invention.

Referring to the accompanying drawings, the concrete contents of the microscope objective according to the present invention are described below. The lens system according to the present invention is arranged as shown in FIG. 1 and comprises three lens components of five lenses in which the first lens component is a positive meniscus lens with its concave surface positioned on the object side, the second lens component is a positive cemented doublet comprising a negative meniscus lens and a biconvex lens, and the third lens component is a positive cemented doublet comprising a negative meniscus lens and a biconvex lens.

For conventional microscope objectives of this kind, a cemented lens component is used as the first lens component. For the lens system according to the present invention, however, a single lens is used as the first lens component as mentioned in the above. By this arrangement, the number of lenses in the lens system as a whole is made smaller by one lens compared with that of conventional lens systems. When a single lens is used as the first lens component as above, correction of chromatic aberration may become considerably difficult. In the present invention, however, chromatic aberration is corrected favourably by using glass of high refractive index and low dispersion or extraordinary dispersion, for which the refractive index is 1.75 or more and Abbe's number is 55 or less, for the first lens component of the lens system.

Besides, when a single lens is used as the first lens component, aberrations other than chromatic aberration may also become unfavourable. For the lens system according to the present invention, however, those aberrations are also favourably corrected to the degree same as or better than those of conventional microscope objectives of this kind by using the above-mentioned new type of glass for the first lens component and, at the same time, by adequately selecting glass materials for respective lenses of the second and third lens components, radii of curvatures of respective lenses, etc.

A preferred embodiment of the lens system according to the present invention is shown below.

Embodiment $f = 1, \beta = -40x, NA = 0.65, WD = 0.168$

| | | |
|---|---|---|
| $r_1 = -4.498$ | | |
| | $d_1 = 0.949$ $\quad n_1 = 1.7865$ $\quad \nu_1 = 50.2$ | |
| $r_2 = -0.926$ | | |
| | $d_2 = 0.023$ | |
| $r_3 = 2.564$ | | |
| | $d_3 = 0.186$ $\quad n_2 = 1.7847$ $\quad \nu_2 = 25.7$ | |
| $r_4 = 1.349$ | | |
| | $d_4 = 0.391$ $\quad n_3 = 1.4866$ $\quad \nu_3 = 84.5$ | |
| $r_5 = -2.151$ | | |
| | $d_5 = 0.660$ | |
| $r_6 = 4.399$ | | |
| | $d_6 = 0.186$ $\quad n_4 = 1.8061$ $\quad \nu_4 = 40.8$ | |
| $r_7 = 1.318$ | | |
| | $d_7 = 0.384$ $\quad n_5 = 1.4978$ $\quad \nu_5 = 66.8$ | |
| $r_8 = -2.587$ | | | where reference symbols $r_1$ through $r_8$ represent radii of curvatures of respective surfaces of lenses, reference symbols $d_1$ through $d_7$ represent thicknesses of respective lenses and spaces between lenses, reference symbols $n_1$ through $n_5$ represent refractive indexes of respective lenses, reference symbols $\nu_1$ through $\nu_5$ represent Abbe's numbers of respective lenses.

For the above embodiment of the present invention, graphs of aberration curves are shown in FIGS. 2A, 2B, 2C and 2D. Out of these figures, FIG. 2A shows spherical aberration, FIG. 2B shows OSC', FIG. 2C shows astigmatism and FIG. 2D shows distortion.

As it is evident from the above-mentioned embodiment and graphs of its aberration curves, the microscope objective according to the present invention comprises a small number of lenses, i.e., three lens components of five lenses, and its chromatic aberration and other aberrations are corrected quite favourably. Besides, for the microscope objective according to the present invention, it is possible to make the work distance 10% to 15% longer compared with conventional microscope objectives of the achromat class with magnification about 40x. Therefore, the lens system according to the present invention is very convenient for practical use.

I claim:

1. A microscope objective comprising three lens components of five lenses wherein the first lens component is positive meniscus lens with its concave surface positioned on the object side, the second lens component is a positive cemented lens comprising a negative meniscus lens and a biconvex lens and the third lens component is also a positive cemented lens comprising a negative meniscus lens and a biconvex lens, said microscope objective having the following numerical values:

$f = 1$ $r_1 = -4.498$
$\quad d_1 = 0.949 \quad n_1 = 1.7865 \quad \nu_1 = 50.2$
$r_2 = -0.926$
$\quad d_2 = 0.023$
$r_3 = 2.564$ -Continued

| | | |
|---|---|---|
| $r_4 = 1.349$ | $d_3 = 0.186$ | $n_2 = 1.7847$ | $\nu_2 = 25.7$ |
| $r_5 = -2.151$ | $d_4 = 0.391$ | $n_3 = 1.4866$ | $\nu_3 = 84.5$ |
| $r_6 = 4.399$ | $d_5 = 0.660$ | | |
| $r_7 = 1.318$ | $d_6 = 0.186$ | $n_4 = 1.8061$ | $\nu_4 = 40.8$ |
| $r_8 = -2.587$ | $d_7 = 0.384$ | $n_5 = 1.4978$ | $\nu_5 = 66.8$ | where reference symbols $r_1$ through $r_8$ represent radii of curvatures of respective surfaces of lenses, reference symbols $d_1$ through $d_7$ represent thicknesses of respective lenses and spaces between lenses, reference symbols $n_1$ through $n_5$ represent refractive indexes of respective lenses, reference symbols $\nu_1$ through $\nu_5$ represent Abbe's numbers of respective lenses.

* * * * *